United States Patent [19]
Rouquette

[11] Patent Number: 5,200,930
[45] Date of Patent: Apr. 6, 1993

[54] TWO-WIRE MULTI-CHANNEL STREAMER COMMUNICATION SYSTEM

[75] Inventor: Robert E. Rouquette, Kenner, La.

[73] Assignee: The Laitram Corporation, Harahan, La.

[21] Appl. No.: 825,007

[22] Filed: Jan. 24, 1992

[51] Int. Cl.⁵ .............................................. G01V 1/22
[52] U.S. Cl. .................................................... 367/76
[58] Field of Search ..................... 367/20, 76, 80; 340/870.18, 870.26, 854.9

[56] References Cited

U.S. PATENT DOCUMENTS

| | | | |
|---|---|---|---|
| 3,958,216 | 5/1976 | Chapman | 367/80 |
| 4,219,810 | 8/1980 | Joosten | 340/853 |
| 4,912,684 | 3/1990 | Fowler | 367/76 |
| 4,967,400 | 10/1990 | Woods | 367/21 |

*Primary Examiner*—Ian J. Lobo
*Attorney, Agent, or Firm*—James T. Cronvich

[57] ABSTRACT

For use with marine seismic streamers, a two-wire, multi-channel communication system capable of handling the high throughput necessary for effective communication between a central controller aboard a tow vessel and the many sensors deployed along the streamer. The central controller includes an intelligent modem with the capability of transmitting and receiving frequency-modulated message signals on one or more signal lines, such as conventional twisted-pair wires, over a number of individual inbound and outbound frequency channels. In the preferred embodiment, seventeen channels are spread over a frequency band ranging from about 20 kHz to 100 kHz, thereby making available for communication a bandwidth much wider than available in conventional single-channel streamer communication. In this way, many positioning sensors, such as compasses, depth sensors, cable-leveling birds, and acoustic-ranging transceivers, attached to the streamer and each having a transmitter and receiver tuned to one of the modem's inbound and outbound channels, respectively, can be put in communication with the modem. To take advantage of its high throughput capability, the intelligent modem refers to a stored table of individual sensor parameters, such as sensor type, transmit channel, and receive channel, to schedule an efficient scan of the sensors. As a diagnostic tool, the communication system also monitors the quality and performance of the communication link by measuring and recording such parameters as the transmitted and received signal strengths, signal-to-noise ratios, and number of incorrectly received messages.

25 Claims, 9 Drawing Sheets

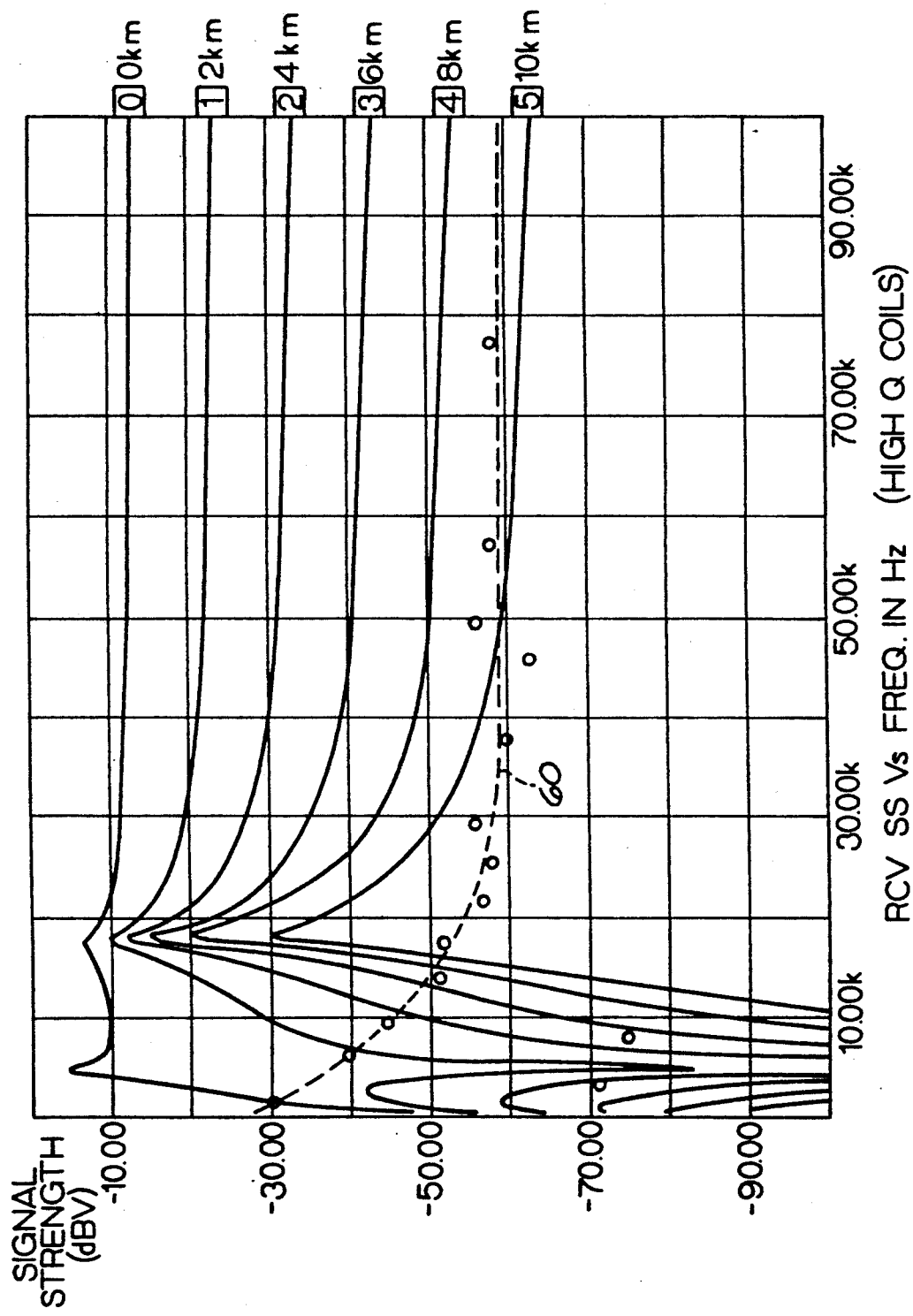

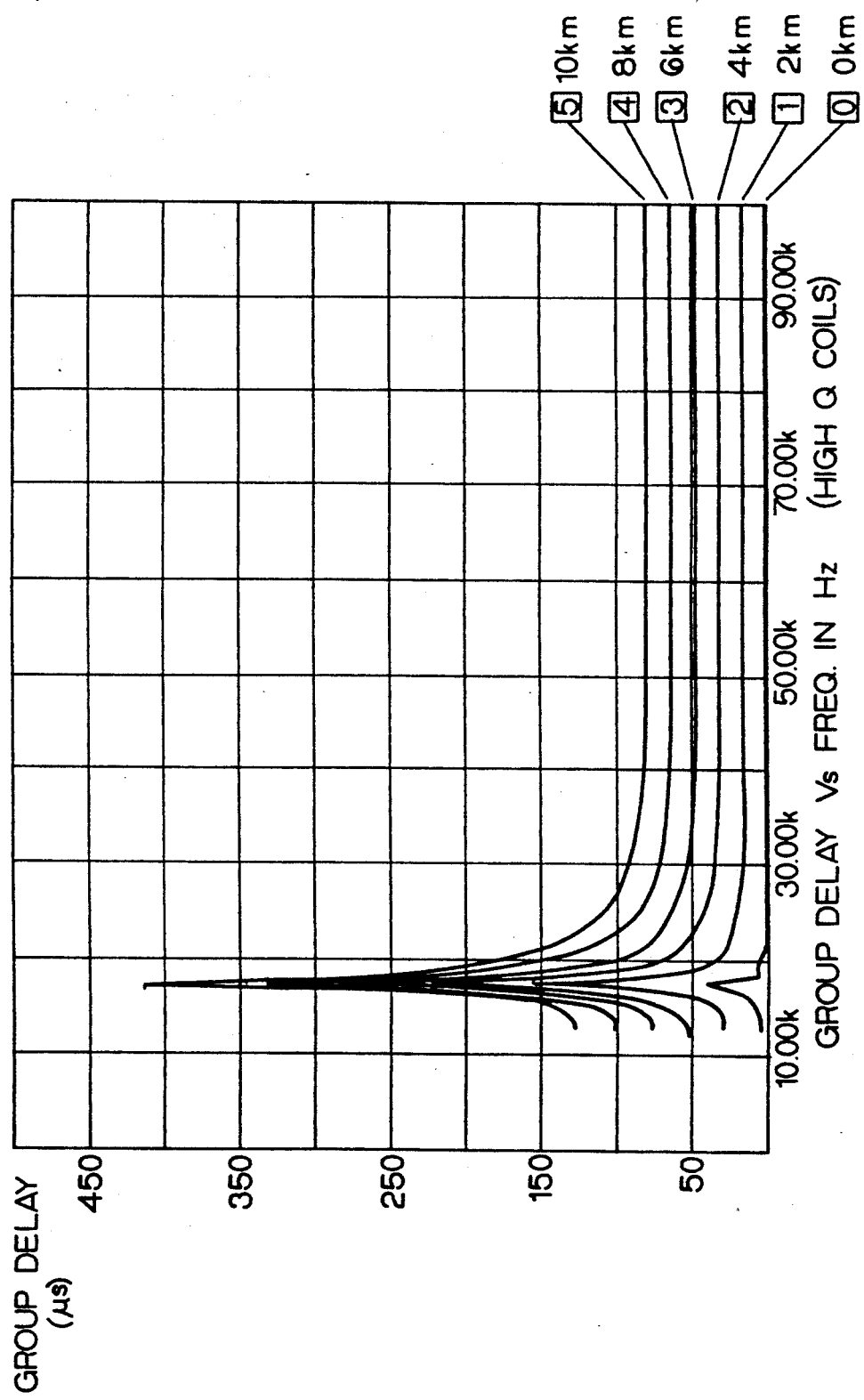

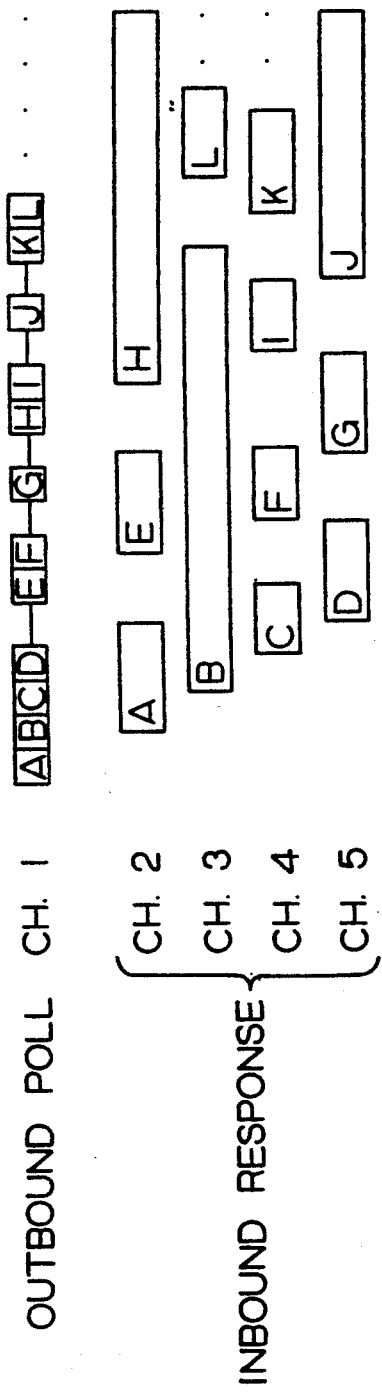

TWO-WIRE MULTI-CHANNEL STREAMER COMMUNICATION SYSTEM

FIELD OF THE INVENTION

This invention relates to multiple sensor communication and, more particularly, to apparatus and methods for achieving multi-channel communication with many sensor devices connected across a two-wire communication path in a seismic streamer cable.

BACKGROUND OF THE INVENTION

In a marine seismic survey, a surveying vessel tows one or more seismic cables or streamers. Each streamer is outfitted with distributed seismic transducers, namely hydrophones, and position-control devices and position-determining sensors, such as cable-leveling birds, compasses, depth (pressure) sensors, and hydroacoustic ranging transceivers. Data from the hydrophones are sent to a controller on board the vessel via a high-speed data link, which could be an optical-fiber link. Data from the position sensors, on the other hand, are typically transmitted to the controller via a two-wire, twisted-pair line, each wire of the pair being no larger than size 22 AWG. Sensors are connected along the twisted pair in one of two ways. First, in-streamer sensors are connected in parallel directly across the twisted pair. Typically, in-streamer sensors are also powered over the twisted pair. Second, outlying sensors, such as those sensors residing in cable-leveling birds or hydroacoustic transceivers, are individually coupled to the twisted pair by means of a coupling coil connected in parallel across the twisted pair. Each outlying sensor has an individual, associated coil in the streamer.

The coupling coils in the streamer are conventionally tuned to the same frequency and typically have a fairly high selectivity, or Q, giving the two-wire communication system a narrow bandwidth and a relatively low data rate. The high Q further makes tuning of the transmitting frequency critical for effective communication. Because noise generated in the neighboring power system for the high-speed hydrophone data link occurs at a dominant frequency of about 2 kHz with harmonic level decreasing with frequency to beyond 100 kHz, typical two-wire communication takes place at about 25 kHz. Conventional communication is achieved my means of frequency-shift-keying (FSK) modulation. Other variations of angle modulation, such as quadrature-phase-shift keying (QPSK) and bipolar-phase-shift keying (BPSK), are also commonly used. Carrier frequencies on the order of 20 kHz-30 kHz are common. Proper tuning of the carrier frequency is critical to achieve a signal-to-noise ratio adequate for effective communication. Thus, present-day two-wire streamer communication relies heavily on a properly tuned system.

Prior art two-wire communication with position sensors on streamers has generally been realized by half-duplex, single-channel communication schemes. Consequently, only one sensor is allowed to send data at a time. Likewise, no sensor may send data while the controller is communicating. Such limitations have only recently become important. Several developments promise to make the half-duplex, single-channel communication system inadequate to meet expected demands in position-determining requirements. First, hydroacoustic ranging systems are seeing more widespread use. The positioning accuracy they provide, particularly in multi-streamer applications, is necessary to support the increased accuracy being demanded of seismic surveys. Each hydroacoustic transceiver typically transmits much more data to the controller than other sensors, such as compasses and depth sensors. Second, maximum streamer lengths of 10 km are expected to become commonplace, in contrast to 6 km today. Longer streamers accommodate more sensors on a single twisted pair with the concomitant increase in data traffic. Third, in the continuing quest for greater accuracy, today's typical spacings of every 300 m for depth sensors and compasses may well be replaced by spacings of 100 m, for a threefold increase in the number of these sensing devices. Fourth, to avoid interference with seismic measurement activity, availability of the communication system for data traffic may be limited to two seconds or less every seismic shot interval, which is typically ten seconds. Thus, in view of the expected expanded use of acoustics, longer streamers, closer sensor spacing, and narrower data transmission intervals, prior art two-wire streamer communication systems will be inadequate to handle the increased data traffic.

Aside from being unable to handle the increased data traffic, prior art two-wire communication systems do not predict communication failures. Failure to terminate the twisted-pair line properly causes standing waves on the line that can null out the signals at sensor positions along the line. Broken or shorted connections are another source of faulty communications. Finally, saltwater leakage causes deterioration of the communication link over time. Prior art communication systems do not recognize deterioration of the communication link until it is all but dead.

Therefore, one object of the invention is reliable, high throughput data communication over existing twisted-pair lines with many sensors distributed along marine seismic streamers up to 10 km long. It is a further object of the invention to permit early diagnosis of deteriorating communication so that prompt corrective action can be taken.

BRIEF DESCRIPTION OF THE DRAWINGS

For a further understanding of the nature and objects of the present invention, reference should be made to the following detailed description, including the accompanying drawings, in which:

FIG. 3B is a family of curves as in FIG. 3A, but for a higher Q coupling coil, along with the interference spectrum in the streamer environment;

FIG. 4B is a family of curves as in FIG. 4A, but corresponding to the high Q coupling coil having the signal strength characteristic of FIG. 3B;

FIG. 8 is a timing diagram depicting an exemplary polling and response sequence according to the invention; and FIG. 9 is a chart showing the preferred channel assignment of the communication system of the invention.

SUMMARY OF THE INVENTION

These and other objects are achieved by the present invention, which provides a multi-channel, two-wire communication system for sending commands and data requests to and receiving data rom many positioning sensors and cable-leveling devices distributed along a seismic streamer. The apparatus of the invention includes a central controller comprising an intelligent modem that can scan the many streamer devices for cable-positioning data each seismic shot interval. By referring to an equipment table stored in memory, the intelligent modem polls each device in an efficient and orderly fashion by transmitting message signals over an outbound channel. Responses from the polled devices in the form of message signals are received by the modem over one or more inbound channels different from the outbound channel. According to a preferred embodiment, a modem has the capability of transmitting outbound commands or data request messages one of four channels as frequency-modulated signals and of receiving frequency-modulated response messages on one of thirteen inbound channels.

My measurements and modeling of the loss and group delay characteristics of conventional 22 AWG and smaller twisted-pair, coupling-coil-laden streamer communication lines revealed relatively flat loss and group delay characteristics above conventional coil resonant frequencies of 20 kHz-25 kHz up to about 100 kHz. My further measurements of the power system interference spectrum level revealed signal-to-noise ratios adequate for successful communication at frequencies from about 200 kHz up to 100 kHz. The novel streamer communication system of the invention takes advantage of the newly recognized loss and group delay characteristics and the interference spectrum by operating over a multitude of channels between about 20 kHz and 100 kHz, instead of a single channel as is conventionally done, thereby permitting the much higher data throughput rates necessary for advanced cable-positioning solutions. The invention additionally provides an operator on board the survey vessel with communication quality and performance measures, such as inbound and outbound signal strengths and signal-to-noise ratios, ac line impedance, dc line load, false carrier detections, and message errors for detection of streamer problems earlier than heretofore possible.

DETAILED DESCRIPTION OF THE INVENTION

Figure 1:
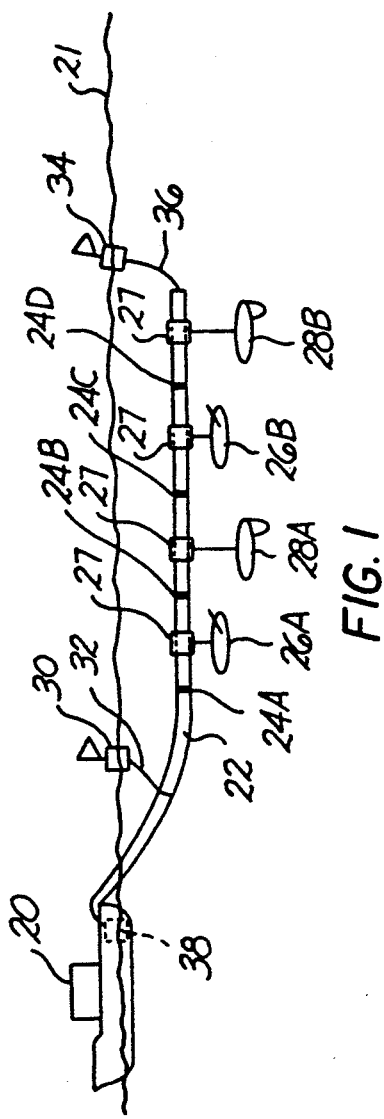
FIG. 1 is side view of a seismic surveying vessel towing a streamer outfitted with sensing and streamer control devices in communication with a controller aboard the vessel in accordance with the invention.

A seismic surveying vessel 20 is depicted in FIG. 1 towing a seismic streamer 22 beneath the sea surface 21. Distributed along the length of the streamer 22 are in-streamer sensors 24A-D, such as compasses and depth sensors, and outboard devices, such as cable-leveling birds 26A-B and acoustic ranging transceivers 28A-B. For brevity, all such devices are hereinafter referred to generally as sensors. The outboard sensors are connected to the streamer 22 by means of collars 27 clamped around the streamer. The streamer includes a front-end marker buoy 30 tethered to the streamer 22 by a tether cable 32 and a tail-end buoy 34 tethered to the end of the streamer 22 by a tether cable 36. The sensors 24, 26, and 28 are all in communication with a central controller 38 on board the vessel 20. Hydrophones (not shown) are also distributed along the streamer 22 for detecting seismic energy generated by a seismic source (also not shown) and reflected off geologic structures in the earth's surface. The birds 26A-B, such as the Model 5000 manufactured by DigiCOURSE, Inc., the subsidiary of the assignee of this invention, are used to control the depth of the streamer 22. Outfitted with heading sensors and depth sensors, a bird 26 can also communicate heading and depth data to the on-board controller 38 for use in predicting the shape of the streamer 22. The acoustic ranging transceivers 28A-B transmit transit time information to the controller 38 also for use in estimating the shape of the streamer 22. Of course, a typical deployment would include many more of such sensors and more streamers than shown in FIG. 1.

Figure 2:
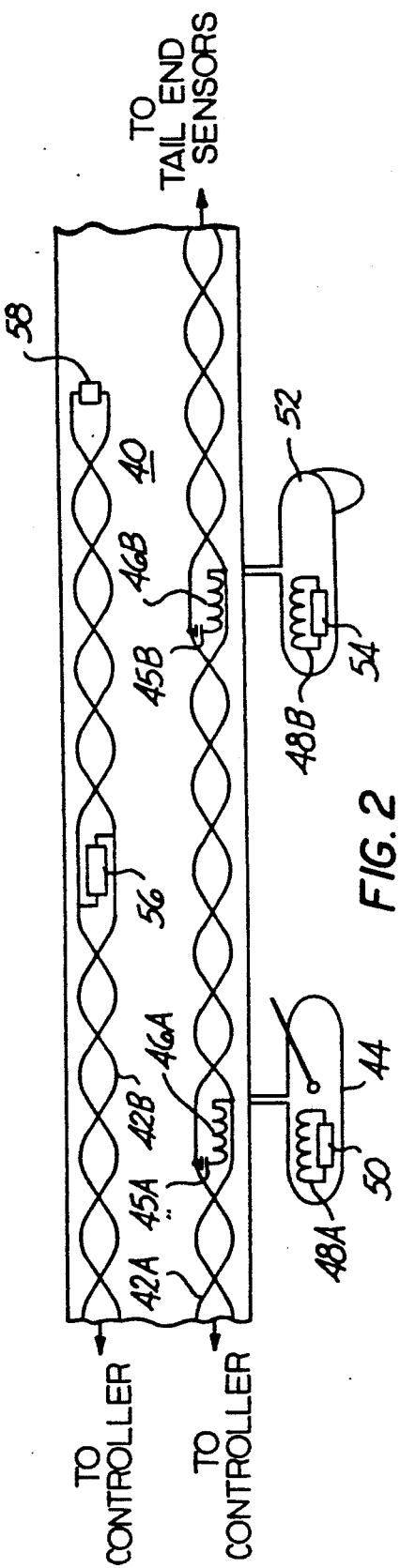
FIG. 2 is a partial cutaway schematic view of a section of a conventional seismic streamer representing two twisted-pair communication lines, one showing parallel-connected coupling coils, in-line devices, and a line termination.

Communication between the sensors and the on-board controller is effected over one or more two-wire lines running through the streamer as shown in FIG. 2. The cutaway side view of a portion of a streamer 40 reveals, in this example, two twisted-pair lines 42A-B. An outboard bird 44, clamped to the streamer 40 by a collar (not shown), communicates with the on-board controller by means of inductive coupling between an in-streamer primary coil 46A and a secondary coil 48A within the bird 44 or its collar. A capacitor 45A, in series with the primary coil 46A, blocks direct current used to power in-streamer sensors. Control signals are received by the bird electronics 50 to control the wings of the bird and, thereby, the depth of the streamer. The bird electronics also measure various operating parameters, such as depth, heading, wing angle, temperature, and battery status, and send such data to the controller upon request. In a similar manner, the controller communicates over the same line 42A with an acoustic ranging transceiver 52 and its internal electronics package 54 by means of a similar primary coil 46B and capacitor 45B and secondary coil 48B. As can be seen, each outboard device is put into communication with the line 42A by means of a corresponding coil 46 connected in parallel across the twisted-pair line. In-streamer devices, such as a heading sensor 56, are connected directly in parallel across the lines of the line 42B. To prevent line reflections that can cause nulls in the communication signals, the line 42B is terminated with its characteristic impedance 58. Thus, a twisted-pair line over which cable-position sensors communicate with the on-board controller contains a number of coupling coils or in-streamer devices all connected in parallel across the line. Each sensor has a unique address or serial number identifier for communication addressing. An individual 10 km twisted-pair line could include up to 377 parallel sensors. For long streamers having more sensors than a single twisted-pair line can handle, additional lines could be used as exemplified by the two twisted-pairs 42A and 42B in FIG. 2.

Figure 3A:
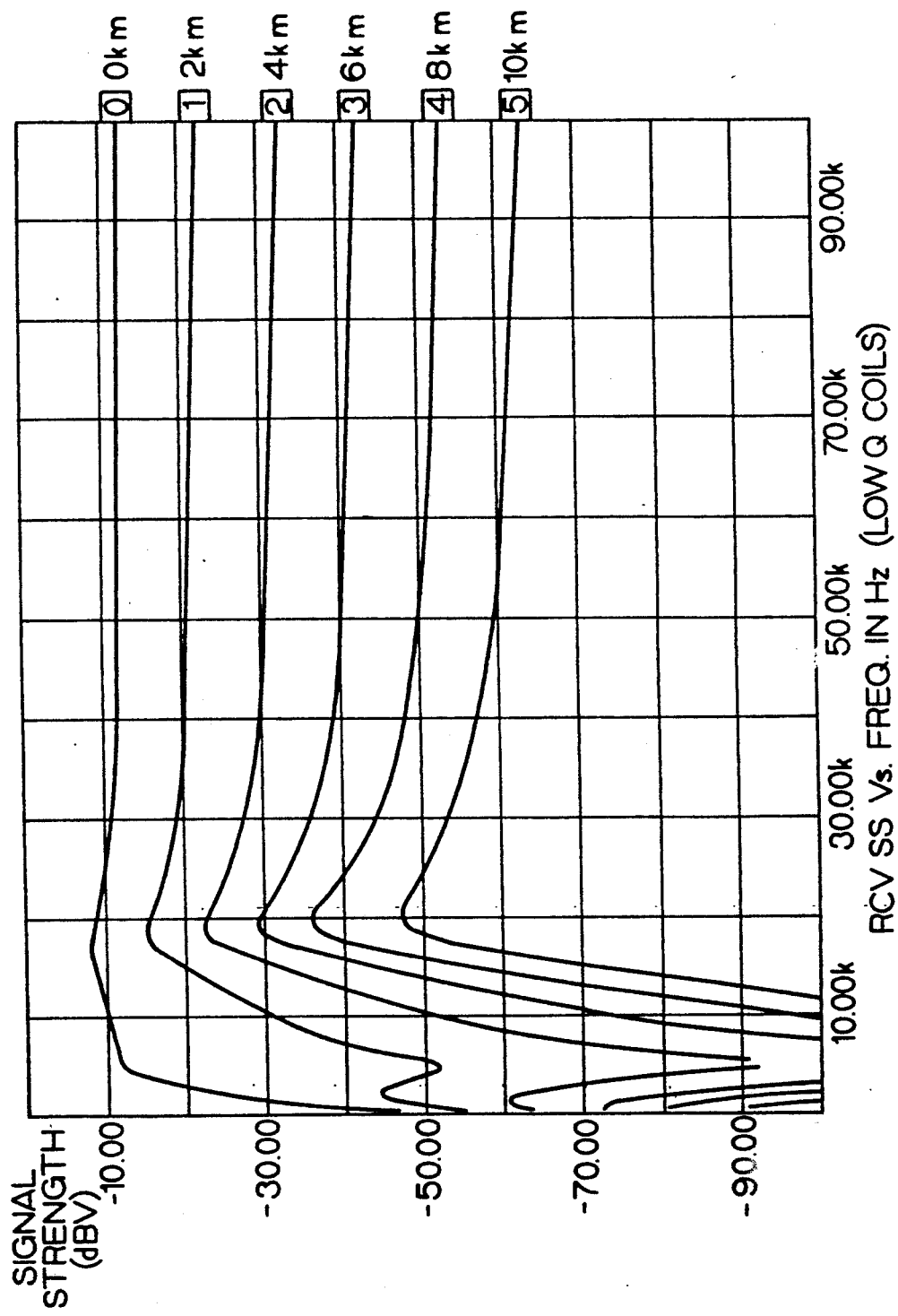
FIG. 3A is a family of curves representing the signal strength as a function of frequency for various distances from a 20 dBV (10 V) signal source for a conventional 22 AWG twisted-pair communication line with a number of low Q coupling coils distributed therealong.
Figure 4A:
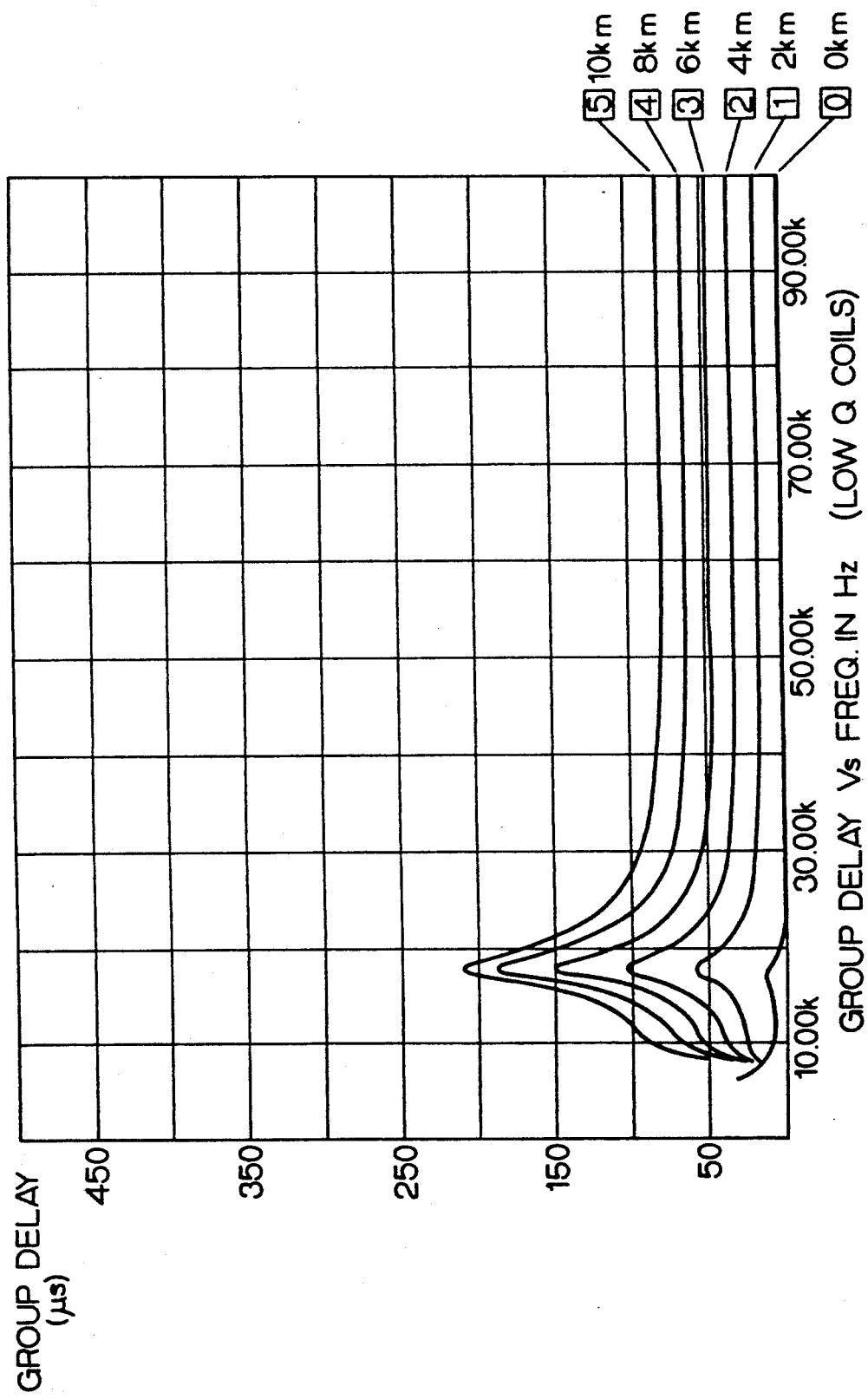
FIG. 4A is a family of curves representing the group of delay as a function of frequency for various distances from a signal source, corresponding to the line with low Q coupling coils having the signal strength characteristic of FIG. 3A.

In a conventional twisted-pair communication system, with a wire size of 22 AWG and having a number of identical low Q coupling coils distributed therealong, the signal strength characteristic is typified by FIG. 3A. For convenience of comparison with the interference spectrum, the signal strength of a signal 10 transmitted at a level of 20 dBV, or 10 V, by a signal source is plotted as a function of frequency for various distances from the source, instead of the reciprocal loss characteristic. The signal strength characteristic for a line having a number of high Q coils is shown in FIG. 3B. For example, in FIG. 3A, at 50 kHz with low Q coils, the signal strength ($-50$ dB) at a distance of 8 km from the signal source is about 19 dB less than the signal strength ($-31$ dB) at a distance of 4 km. It is important to notice that, although the signal strength decreases with frequency, so does the interference spectrum level 60, which decreases with frequency from 20 kHz to 100 kHz, as shown in FIG. 3B. Furthermore, the group delay characteristic between 20 kHz and 100 kHz for both high and low Q coils, shown in FIGS. 4A and 4B, is relatively flat. A non-flat group delay characteristic for which the delays of the upper and lower frequencies of a frequency-modulated signal differ by more than about 0.1 ms at 2400 baud degrades the performance of conventional modems. Thus, a significant bandwidth is available for frequency-modulated communication over existing twisted-pair lines above the coil resonant frequency of about 20 kHz.

Instead of limiting communication to the relatively narrow bandwidth of the coil resonance characteristic, the present invention takes advantage of the wide bandwidth available above 20 kHz to communicate efficiently with many sensors. The preferred communication scheme is a multi-channel approach, in which 17 individual narrow-band channels from about 20 kHz to 100 kHz are used to permit full-duplex communication with many sensors distributed along a streamer. Channels are limited to below 100 kHz, because, at higher frequencies, the two-wire line behaves more like a distributed parameter transmission line than a lumped parameter circuit. Such a multi-channel approach permits sensors operating on separate channels to communicate simultaneously. Because of the signal strength characteristics and interference spectrum shown in FIG. 3, channels are assigned to sensors according their distances from the on-board controller for best signal-to-interference ratios. Lower frequency channels are assigned to those sensors farthest from the controller. One skilled in the art will recognize that the invention could likewise be used with communication lines other than twisted-pair lines, as long as they exhibit similar signal strength and group delay characteristics.

Figure 5:
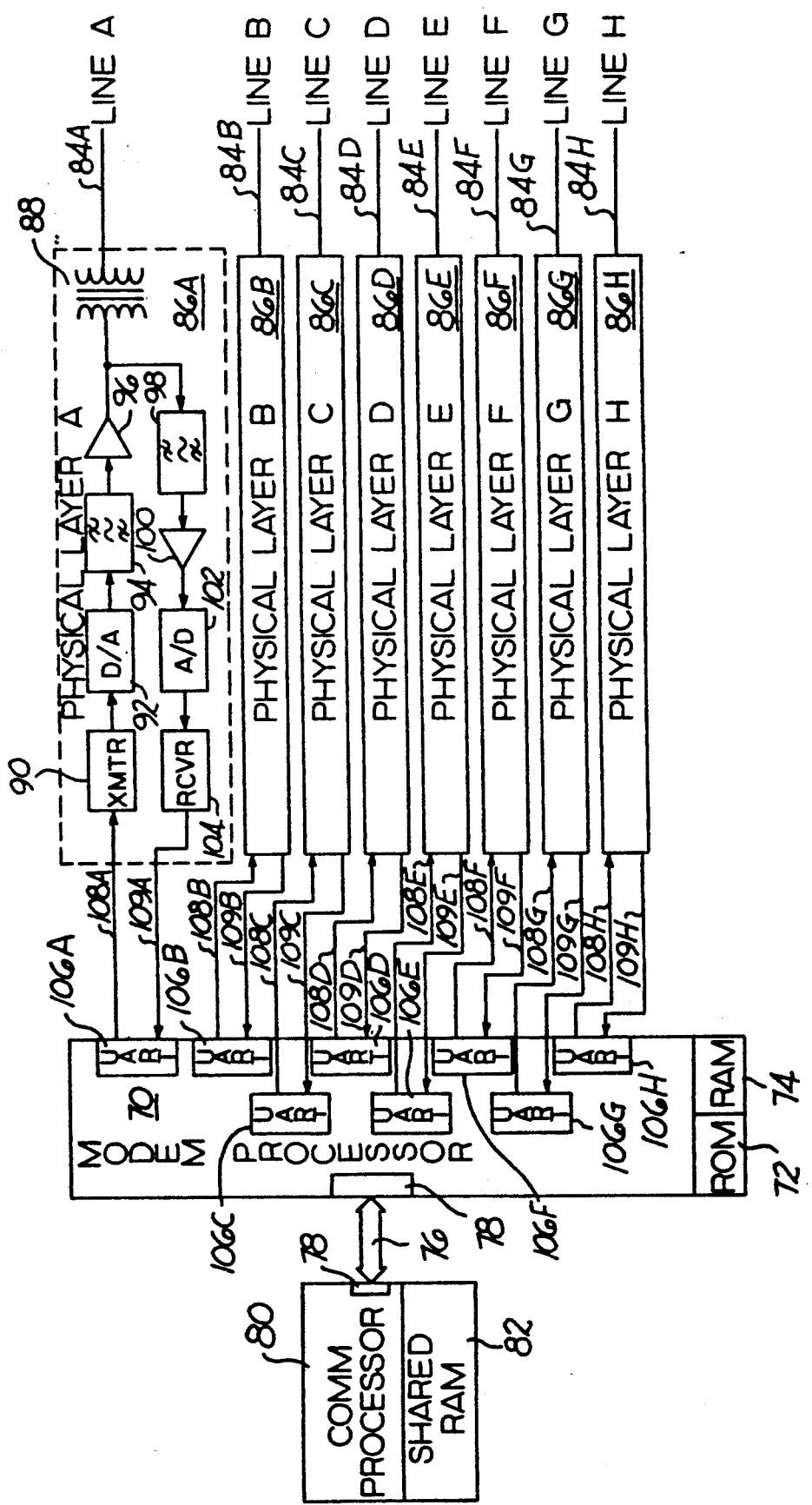
FIG. 5 is a partial schematic block diagram of a preferred embodiment of the communication apparatus of the invention.

A block diagram of the multi-channel communication system of the preferred embodiment of the invention is shown in FIG. 5. Communication with streamer sensors is realized by a modem configured around a modem processor 70 having a RAM scratchpad memory 74 and non-volatile memory 72, such as ROM, for program storage. The modem processor sends and receives sensor commands and data from the other processing equipment on board the survey vessel over a parallel system bus 76, such as a VME bus. Bus control circuits 78 interface the modem processor 70 with a communication processor 80 in communication with other on-board processing equipment. (The central controller 38 in FIG. 1 includes the modem processor 70 and the communication processor 80.) Preferably, data are passed between the communication processor 80 and the modem processor 70 through designated memory areas in a dual-ported RAM 82 shared by the two processors. Interrupts from the communication processor 80 signifying the start of a sensor scan cycle are also passed to the modem processor 70 over the system bus 76.

The modem processor 70 communicates with the individual sensors over twisted-pair lines 84A–H each containing a number of parallel-connected coils or in-streamer sensors. For simplicity each twisted-pair line is represented by a single line in FIG. 5. Each line is connected to an individual modem physical layer 86A–H. A typical physical layer comprises a transmit path, a receive path, and an isolation transformer 88.

The transmit path includes a digital transmitter 90 controlled by the modem processor 70. The digital transmitter 90 is programmed or preset to synthesize a frequency-modulated digital signal at its output, the modulation being a function of the data to be transmitted. The digital signal is applied to a D/A converter 92 to produce an analog frequency-modulated signal, which is filtered by a bandpass filter 94 to remove digital noise and out-of-channel signal, and amplified by a power amplifier 96 before being coupled onto the line 84A via the transformer 88 for transmission to the sensors. Data transmitted by a sensor are coupled into the physical layer 86A through the transformer 88. A bandpass filter 98 eliminates low-frequency interference, such as seismic interference and power system interference, and transmitter interference from the receiver. The filtered signal is buffered in a pre-amp 100 before being applied to an A/D converter 102, which converts the analog receive signal into a digital signal to be demodulated by a digital receiver 104. The demodulated data are then sent to the modem processor 70 from the physical layers 86A–H over UART ports 106A–H. Although only two lines 108A–H and 109A–H are shown for each UART port 106A–H, a full RS-232C handshaking link is implemented, as will be described hereinafter. Although the block diagram of FIG. 5 shows eight physical layers, it should be recognized that realizations having more physical layers are within the scope of the invention.

In a preferred embodiment, the transmitter 90 and the receiver 104 are realized by a multiplicity of digital-signal-processing (DSP) integrated circuits, such as the Model TMS320C40 manufactured by Texas Instruments, Inc., Dallas, Tx. Such a device allows great flexibility in selecting carrier frequencies and modulation schemes. In this embodiment, however, a minimum frequency-shift-keying modulation (MSK) scheme is used whereby a logic low data bit causes a frequency of $f_c - 600$ Hz to be transmitted and a logic high data bit causes a frequency of $f_c + 600$ Hz to be transmitted where $f_c$ is the transmit channel center frequency. Data bit rates of 2400 baud make the system compatible with the group delay characteristic of the channel. As a transceiver, the DSP integrated circuit is capable of full duplex operation, i.e., simultaneous transmission and reception, as well as simultaneous multi-channel reception.

Figure 6:
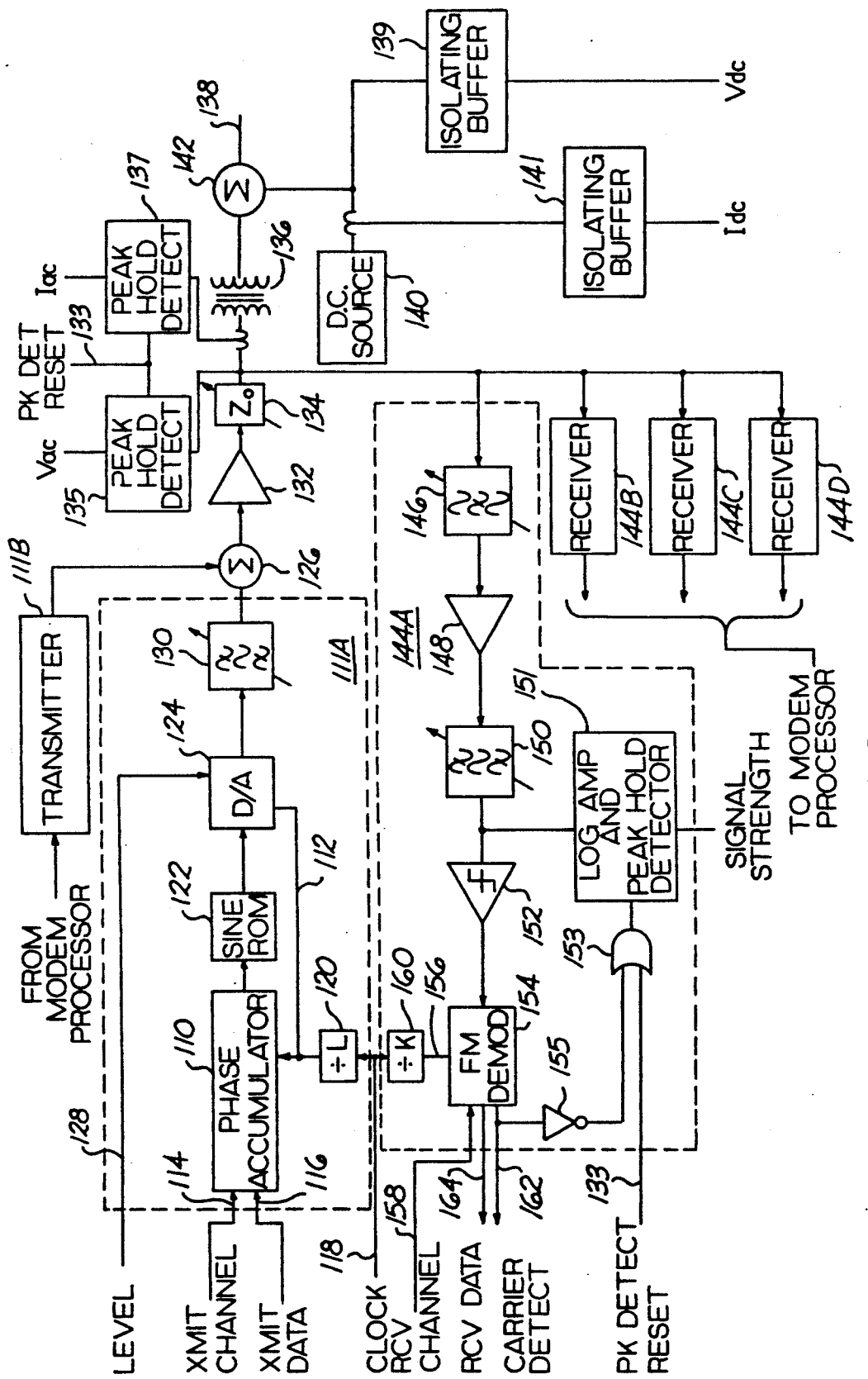
FIG. 6 is a schematic block diagram of another embodiment of the invention showing some components in more detail than in FIG. 5.

In another embodiment, shown in the schematic block diagram of FIG. 6, the transmit and receive functions of the physical layer are performed by analog and digital circuitry not including a DSP integrated circuit. Each transmitter 111A-B includes a digital phase accumulator 110 whose output is a digital count incremented at a rate determined by the transmit clock signal 112, the transmit channel frequency setting 114, and the data bit 116 to be transmitted. The transmit clock signal may be derived from a bus clock signal 118 by a frequency divider 120. For a given transmit clock rate and a selected transmit channel, the rate of the digital count out of the phase accumulator is determined by the transmit data. Preferably, the transmit data 116 are sent serially to the phase accumulator 110 from a TX line of a UART on the modem processor using standard NRZ asynchronous serial communication, including start and stop bits. The sequence of data logic levels, alternating between highs and lows, adjusts the output count between two rates, which are converted into two respective frequencies by sine ROM 122 and D/A converter 124, thereby producing an MSK-modulated signal at the output of the D/A converter 124. The phase accumulator and sine ROM functions can be implemented by a single integrated circuit, such as an HSP45102 numerically controlled oscillator, manufactured by the Harris Corporation, Melbourne, Fla. For a logic low data bit, the frequency is selected to be $f_c-600$ Hz; for a logic high data bit, the frequency is selected to be $f_c+600$ Hz, where $f_c$ is the transmit channel center frequency. The start of the conversion process in the D/A converter 124 is controlled by the transmit clock input signal 112, which is the clocking rate of the digital signal. The modem processor can also control the amplitude of the output of the D/A converter and, hence, the transmitted energy, by means of a level adjust signal 128. The analog signal out of the A/D converter 124 is filtered by an adjustable bandpass filter 130, which removes digital quantization noise and out-of-channel signals. The filtered analog signal is amplified in a power amplifier 132 terminated in adjustable line-matching impedance 134 for maximum power transfer to the communication line. Other similar transmitters, operating on different channels, may be interconnected into the communication system, as indicated by a transmit signal summer 126. Voltage and current monitoring circuits 135 and 137 measure the output ac voltage and current levels at the modem side of an isolation transformer 136. Peak-hold detector circuitry reset by a processor-controlled signal (PK DET RESET) 133 is used to measure the voltage across and the current through the transformer 136 to be read by the modem processor. Power to drive in-streamer devices over the communication line 138 is provided by a dc power supply 140, whose output voltage and current can be monitored by the modem processor 70 through isolated voltage and current monitoring circuits 139 and 141, comprising filtered buffers and isolation amplifiers to isolate the line electrically from the modem processor 70. The dc power is coupled into the line 138 as indicated by a signal summer 142. Of course, the transmit signals could alternatively be summed on the line side of the transformer 136 by a network such as the signal summer 142, instead of by the transmit signal summer 126. Thus, the transmitter converts a serial asynchronous NRZ data stream from a UART controlled by the modem processor into an MSK-modulated signal at the same data rate as the serial UART data. The MSK-modulated transmit signal is summed with dc power for in-streamer devices and sent down the communication line for decoding by the appropriately addressed sensors. In a full-duplex system, responses from various sensors may occur simultaneously on different channels. Simultaneous receive channels are implemented in the embodiment of FIG. 6 by additional receivers for each receive channel. A description of the operation of one receiver suffices to describe the operation of all, which are identical, except for being tuned to receive on separate channels. Four receivers 144A-D are shown in FIG. 6. The input to each receiver is taken from the transformer 136. Although the receivers are shown connected to the modem side of the transformer 136 in FIG. 6, they could alternatively be coupled through individual transformers connected to the line side of the transformer 136. Each receiver, as exemplified by receiver 144A, includes an adjustable notch filter 146 for attenuating the transmit frequency coupled into the receiver. The filtered signals from the streamer sensors are buffered in a pre-amp 148 and further filtered in an adjustable bandpass filter 150 tuned to the designated receive channel frequency. The filtered signal is then limited in a limiter 152 to preserve phase information representing the data and demodulated in an FM demodulator 154. In the embodiment described by reference to FIG. 6, the signals from the sensors to the modem are MSK-modulated signals similar to the signals transmitted to the sensors as previously described. In fact, in the preferred embodiment, each sensor has one transmit path and one receive path similar to those on the modem. The demodulator 154 is tuned to the designated receive channel by means of a receive clock signal 156 and a signal representing the receive channel setting 158. The receive clock signal 156 may be derived from a bus clock signal 118 by a frequency divider 160. The demodulator 154 can be realized by an integrated circuit, such as the 74HC297 digital phase-locked-loop manufactured by Texas Instruments. The demodulator 154 indicates to the modem processor that the carrier has been detected via a CARRIER DETECT signal 162. The demodulated receive data 164 is sent to an RX line on a modem processor UART in the conventional NRZ asynchronous format for handling by the message translation logic.

To measure the power level (SIGNAL STRENGTH) of the received signal from a given sensor, the output of the bandpass filter 150 is detected by signal strength monitoring circuitry 151, including, for example, a logarithmic amplifier for dynamic range and a peak-hold detector. As realized by the logic circuit including inverter 153 and OR gate 155, the peak-hold detector can be reset either by the processor-controlled signal PK DET RESET 133 or by the CARRIER DETECT signal 162 whenever the FM demodulator 154 detects no carrier.

Although there are many ways to read and control the operation of the modem transmitters and receivers, the preferred method is to use asynchronous NRZ communication between a UART on the modem processor and the transmitter and receiver circuits. The full RS-232C handshaking protocol is used with, for example, CARRIER DETECT being read by DCD (data carrier detect) and transmitter D/A conversion being enabled by RTS (request to send).

In addition to its ability to send and receive MSK-modulated messages over streamer communication lines, the system of the invention can monitor communication performance. As described with reference to FIG. 6, the transmitted voltage and current for each transmitter channel, the dc voltage and current, and the received signal strength for each receiver channel are measured by conventional circuitry including, for example, operational amplifier circuits.

Figure 7:
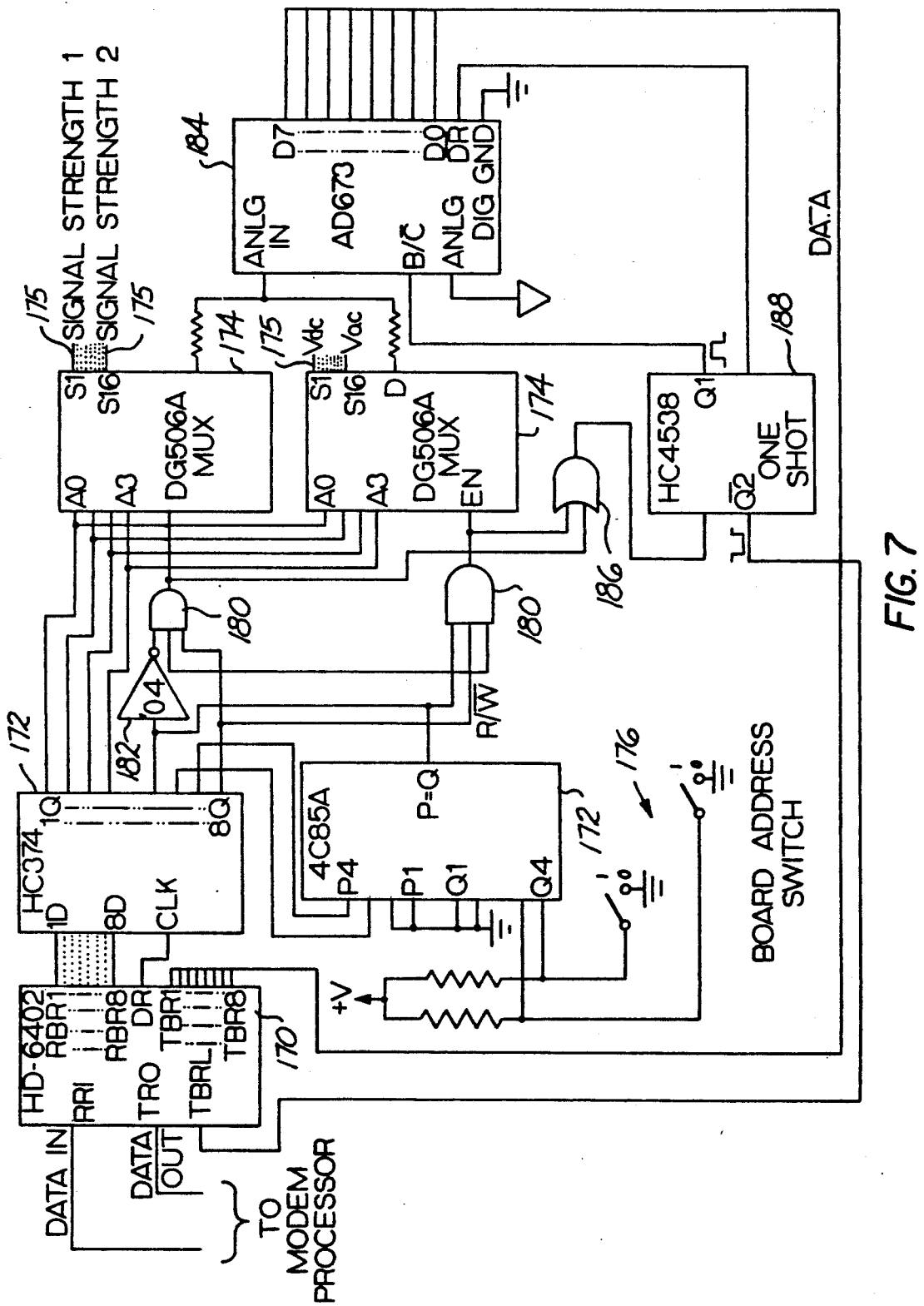
FIG. 7 is a schematic diagram of a multiplexer circuit used in the invention to monitor electrical transmission and reception parameters.

The multiplexer circuit of FIG. 7 is used to select the various measured quantities for reading by the modem processor. Once again, just as for the transmitters and receivers, communication between the modem processor and the multiplexer circuit is via asynchronous NRZ communication. The TX and RX lines of a modem processor UART are connected to the DATA IN and DATA OUT lines of UART chip 170. The modem processor selects a parameter to be read by transmitting to the UART 170 a byte containing a board address, a parameter address, and a read bit. The serial byte received by the UART is presented in parallel to a latch 172, which selects one of 32 analog measurement channels 175 in multiplexers 174, as long as the board is also selected. Up to four boards can be addressed, permitting a total of 128 measurable quantities, including the ac voltage and current $V_{ac}$ and $I_{ac}$, the dc voltage and current $V_{dc}$ and $I_{dc}$, and the signal strengths of each receiver (SIGNAL STRENGTH). The board address is set by a pair of address switches 176 in conjunction with a digital comparator 178. Further address decoding is performed by logic gates 180 and 182. If the board is addressed, one of the analog measurement signals is directed to an A/D converter 184 through one of the multiplexers 174. A read command sent from the modem UART and processed through a logic gate 186 triggers one-shot 188 to generate a convert pulse to start the conversion process in the A/D converter 184. Upon completion of the conversion of the selected measured quantity, the converter 184 generates a conversion complete signal that triggers another channel of the one-shot 188, which generates a pulse to output the converted data from the converter 184 through the UART 170 serially to the modem processor UART over the DATA OUT line. In this way, the many measurable quantities can be easily read.

The measurable quantities are important in diagnosing problems in the communication system. With the test lines shown in FIG. 6, the system can measure and store the following quantities:

1. transmit voltage and current on each transmit channel;

2. background noise on the transmit channel by measuring the transmit voltage and current while not transmitting;

3. received signal strength for each responding sensor;

4. receiver background noise by measuring the signal strength on the receive channel while no data are incoming on that channel; and 5. dc voltage and current supplied to in-streamer devices.

From the first four quantities in the list, the transmit and receive signal-to-noise ratios can be computed by the modem processor 70. Any significant decrease in these signal-to-noise ratios may indicate problems or defects in the streamer, such as salt-water leakage. Likewise, any significant change in the dc voltage and current can indicate short or open circuits along the streamer. Furthermore, sensors capable of measuring the strength of the signals they receive can pass such data to the modem processor for further detailed analysis. With this capability, for example, the signal strength or signal-to-noise ratio as a function of position along the streamer can be determined and displayed to an operator, who can watch for signs of signal degradation, which could indicate problems such as broken or shorted wires in the streamer, an improperly matched termination, and salt-water leakage.

To supplement the signal measurements, communication performance statistics are also computed by the modem processor 70 for each sensor. For example, if a sensor does not respond to a poll request for data, the modem processor 70 increments the number of incomplete polls for that sensor. If the response from a sensor is received with checksum errors, indicating a transmission error, the modem processor 70 increments the bit error counter for that sensor. If the carrier frequency is detected by the receiver when no response is expected, the modem processor 70 increments the number of false carrier detections on that channel. All of the communication performance data are stored in the dual-port RAM 82 for access by the communication processor 80.

As previously described, the preferred embodiment of the invention provides for seventeen channels between about 20 kHz and 100 kHz for communication with sensors over a twisted-pair line. Four of the channels are reserved as outbound, or transmit, channels; thirteen of the channels are inbound, or receive, channels. Preferably, the channel center frequencies are sequentially spaced every 4800 Hz from about 20 kHz to about 100 kHz. Such a spacing is sufficient to provide 85 dB of adjacent channel interference rejection for the 600 Hz-deviated, MSK-modulated signals of the invention. Analysis of the lengths of the required polling (outbound) messages and the response (inbound) messages at a conventional transmission rate of 2400 baud suggests the assignment of channels shown in FIG. 9 to optimize throughput and number of sensors.

In other words, for transmit channels 1, 6, and 11, up to four receive channels can be associated. For transmit channel 16, one receive channel is associated. In assigning channels to devices on a line, transmit channel 1 is first assigned. Then, inbound receive channel 2 is assigned to the 29 sensors farthest from the modem. The next 29 sensors are assigned to transmit data on inbound receive channel 3. This assignment is repeated from the tail end of the streamer toward the head end until up to 116 sensors are assigned to transmit on receive channels 2-5 and to receive outbound poll requests on channel 1. Once these lower-frequency channel assignments are filled, the process is repeated for channels 6-10, then channels 11-15, and finally, if necessary, channels 16 and 17. In this way, the communication system can support up to 377 sensors on a single twisted-pair line, with the lower frequencies assigned to those sensors farthest from the modem. This optimum arrangement of transmit and receive channels is based on the following assumptions:

1. a complete scan (outbound poll and inbound response) of all sensors on the streamer within one second;

2. an average response message of 8 bytes per sensor;

3. a message data rate of 2400 baud;

4. full-duplex asynchronous serial communication;

5. a poll message of two bytes per sensor; and 6. streamers of up to 10 km in length.

All these assumptions are reasonable in view of imminent surveying demands for greater accuracy in 3-D seismic exploration.

A typical scan sequence over channels 1-5 is depicted in FIG. 8, in which the blocks depict message blocks to and from individual streamer sensors designated by a unique letter. Outbound poll messages from the modem board are transmitted on channel 1 to all sensors that can respond on channels 2-5. As soon as sensor A is polled, it responds on channel 2. Furthermore, as soon as the poll of A is completed, sensor B is polled, and so on until a sensor assigned to each inbound channel is polled. In the meantime, response messages are sent from the sensors over their assigned response channels to the modem. As soon as an inbound message is received on a channel, the next sensor on that channel is polled. As shown in the example of FIG. 8, after sensor D is polled all four inbound channels are busy. As soon as the message from sensor A is completed, channel 2 is available, so that the modem can poll sensor E. By the time the poll of E is complete, the response from sensor C on channel 4 is completed, so that sensor F, which responds on channel 4 can be polled. A sensor having a long message length, such as sensor B on channel 3, is skipped until its inbound channel is clear. Using this poll and response scheme, higher throughput communication is possible.

Any sensors that do not respond or whose messages are erroneous may be repolled at the end of the complete scan. The number of repolls can be set for all devices. Thus, the high throughput allows time for repolling, which can be of significant value in a noisy environment.

The invention as described provides a multi-channel communication system operable on conventional two-wire, twisted-pair lines and capable of handling the high data traffic required to support the positioning accuracies and longer streamers being used in three-dimensional seismic surveying. Although the invention is described with respect to a preferred embodiment, modifications thereto will be apparent to those skilled in the art. Accordingly, those novel features defining the spirit and nature of the invention are set forth with particularity in the following claims.

I claim:

1. For use in a seismic streamer system including a streamer cable with a plurality of sensors disposed therealong at individual sensor locations and a signal line for conveying signals to and from the sensors, a multi-channel communication system, comprising:
    a central controller having means for transmitting first message signals on at least one outboard signal channel over the signal line,
    message coupling means connected across the signal line at each sensor location for coupling message signals between the signal line and each sensor, and
    communication means in each of the sensors and coupled to the signal line through said message coupling means for receiving the first message signals and for transmitting second message signals on at least one inbound signal channel over the signal line, said outbound signal channel being different from said inbound signal channel,
    said channel controller further having means for receiving the second message signals,
    said message coupling means further having electrical properties producing a signal line characteristic characterized by a peaked minimum loss and maximum group delay region centered about a resonant frequency and a relatively constant loss and group delay region substantially above the resonant frequency,
    said outbound and inbound signal channels being within said relatively constant loss and group delay region.

2. The communication system of claim 1, further comprising means, in each sensor, for tuning said communication means to receive the first message signals on a preselected one of the outbound signal channels and wherein said communication means further transmits second message signals on a preselected one of the inbound signal channels.

3. The communication system of claim 2, wherein the communication means of a subset of the sensors are all tuned to receive the first message signals on the same preselected outbound signal channel.

4. The communication system of claim 1, wherein said communication system comprises more inbound signal channels than outbound signal channels.

5. The communication system of claim 1, wherein the communication system further comprises means for full-duplex transmission and reception of message signals.

6. The communication system of claim 1, wherein said central controller further comprises means for sequencing the polling of the sensors by causing said means for transmitting to transmit the first message signals in a sequential order.

7. The communication system of claim 6, wherein said means for sequencing causes said means for transmitting to poll each sensor individually by means of a first message signal containing a unique sensor identifier.

8. The communication system of claim 2, wherein said central controller further comprises storage means for storing data representing the inbound and outbound channels preselected for each sensor and comprises means for sequencing the polling of sensors by causing said means for transmitting to transmit the first message signals on the outbound channels preselected for the sensors by reference to the data in said storage means.

9. The communication system of claim 1, wherein said inbound and outbound signal channels range in frequency from about 20 kHz to 100 kHz.

10. The communication system of claim 9, comprising up to seventeen of said inbound and outbound channels.

11. The communication system of claim 1, wherein said means for transmitting comprises a modulator for converting a first serial digital signal into a frequency-modulated signal to be transmitted as a first message signal on the signal line and wherein the second message signals on the signal line are frequency-modulated and said means for receiving comprises a demodulator for converting each second message signal into a second serial digital signal to be processed by said central controller.

12. The communication system of claim 1, wherein said central controller comprises a digital-signal-processing integrated circuit.

13. The communication system of claim 1, further comprising means for measuring and means for recording a plurality of electrical parameters on the signal line.

14. The communication system of claim 13, wherein said means for measuring measures the voltage and current of each outbound signal channel in said means for transmitting.

15. The communication system of claim 13, wherein said means for measuring measures the signal strength of each inbound signal channel in said means for receiving.

16. The communication system of claim 1, wherein said central controller further comprises means for monitoring the performance of the communication system through said means for receiving.

17. The communication system of claim 16, wherein said means for monitoring accumulates the number of second message signals unsuccessfully received by said means for receiving from each sensor.

18. A multi-channel communication system for a seismic streamer, comprising:
- a signal line within the streamer comprising a pair of conductors;
- a central controller having means for transmitting and means for receiving message signals on a plurality of frequency channels over said signal line;
- a plurality of sensors disposed at locations along the streamer and including coupling means at each sensor location, said coupling means coupling message signals between the signal line and the sensors,
- said coupling means further having electrical properties producing a loss and a group delay characteristic for message signals on said signal line,
- said loss characteristic producing a peaked minimum loss region centered substantially at a resonant frequency and a flat, greater loss region at frequencies substantially above said minimum loss region,
- said group delay characteristic producing a maximum delay region centered substantially at the resonant frequency and a constant reduced delay region at frequencies substantially above said maximum delay region;
- each of said plurality of sensors having bidirectional communication means for transmitting message signals on one of the plurality of frequency channels and for receiving message signals on another of the plurality of frequency channels;
- said plurality of frequency channels being substantially above the resonant frequency, whereby message signals on said plurality of frequency channels are attenuated and delayed substantially equally.

19. The communication system of claim 18, wherein said signal line is a twisted-pair line.

20. The communication system of claim 18, wherein said means for receiving comprises a plurality of receivers, each of said receivers being tuned to receive message signals on an individual receive channel selected from the plurality of frequency channels, and wherein said means for transmitting comprises a transmitter configured to transmit message signals on a transmit channel selected from the plurality of frequency channels and different from any receive channel.

21. The communication system of claim 20, wherein said means for transmitting comprises a plurality of transmitters, each of said transmitters configured to transmit signals on an individual transmit channel selected from the plurality of frequency channels and wherein the individual transmit channels and receive channels are different frequency channels.

22. A method for communicating between a plurality of sensors disposed along a seismic streamer at sensor locations and a central controller over a signal line, comprising the steps of:
  (a) electrically coupling each of the sensors to the signal line through individual coupling means connected across the signal line at each sensor location;
  (b) establishing electrical signal line characteristics by means of the electrical properties of the coupling means, the signal one characteristics being characterized by a first region providing a maximum group delay and a peak amplitude response centered about a resonant frequency and a second region, substantially above the resonant frequency, providing a relatively constant group delay and a relatively constant amplitude response;
  (c) establishing a communication path between the central controller and the sensors over the signal line and through the coupling means;
  (d) assigning a first set of individual frequency channels as outbound channels over which message signals are transmitted from the central controller to the sensors, the first set of individual frequency channels being substantially above the resonant frequency;
  (e) assigning a second set of individual frequency channels as inbound channels over which message signals are transmitted from the sensors to the central controller, the second set of individual frequency channels being substantially above the resonant frequency;
  (f) configuring each sensor to transmit message signals on one of the inbound channels and to receive message signals on one of the outbound channels;
  (g) transmitting message signals to the sensors over outbound channels; and
  (h) receiving message signals from the sensors over inbound channels.

23. The method of claim 22, further comprising, after step (f), the step of:
  configuring a group of sensors to receive message signals on a preselected one of the outbound channels and to transmit message signals on a preselected plurality of the inbound channels.

24. The method of claim 23, further comprising the step of:
  configuring a second group of sensors to receive message signals on a second preselected one of the outbound channels and to transmit messages on a second preselected plurality of inbound channels.

25. The method of claim 22, further comprising the step of assigning each sensor a unique identifier and wherein, in steps (g) and (h), the message signals include the unique identifier.

* * * * *